United States Patent [19]

Kawasaki et al.

[11] Patent Number: 4,921,426
[45] Date of Patent: May 1, 1990

[54] POWER-CONNECTION/CAR-MOUNTING DEVICE AND CONNECTION SYSTEM FOR A CAR-MOUNTABLE APPARATUS

[75] Inventors: Nobuhiko Kawasaki, Nara; Kouichi Ikeda, Kashiwara; Shinichi Kimura, Yamatokoriyama, all of Japan

[73] Assignee: Sharp Kabushiki Kaisha, Osaka, Japan

[21] Appl. No.: 183,986

[22] Filed: Apr. 20, 1988

Related U.S. Application Data

[62] Division of Ser. No. 875,583, Jun. 18, 1986, Pat. No. 4,767,337.

[30] Foreign Application Priority Data

| Jun. 18, 1985 | [JP] | Japan | 60-93264 |
| Sep. 10, 1985 | [JP] | Japan | 60-138938 |
| Sep. 10, 1985 | [JP] | Japan | 60-138939 |
| Sep. 12, 1985 | [JP] | Japan | 60-140215 |
| Mar. 25, 1986 | [JP] | Japan | 61-44604 |

[51] Int. Cl.⁵ .......................................... H01R 13/631
[52] U.S. Cl. ........................................ 439/34; 439/248
[58] Field of Search .................... 439/247, 248, 34–36, 439/246, 249–252

[56] References Cited

U.S. PATENT DOCUMENTS

| 1,618,851 | 2/1927 | Thunberg et al. |
| 2,220,610 | 11/1940 | Miller |
| 2,489,864 | 11/1949 | Gravener |
| 3,094,364 | 6/1963 | Lingg ........................ 439/247 |
| 3,494,657 | 2/1970 | Tantlinger et al. |
| 3,600,025 | 8/1971 | Brainard |
| 3,698,748 | 10/1972 | Petri |
| 3,707,303 | 12/1972 | Petri |
| 3,808,577 | 4/1974 | Mathauser |
| 3,926,532 | 12/1975 | Schlenker et al. |
| 4,394,096 | 7/1983 | Stevens |
| 4,453,449 | 6/1984 | Hollmann |
| 4,455,719 | 6/1984 | Morita |
| 4,647,129 | 3/1987 | Kandybowski et al. ........... 439/246 |

FOREIGN PATENT DOCUMENTS

| 0033027 | 8/1981 | European Pat. Off. |
| 374845 | 3/1964 | Switzerland |
| 281366 | 11/1927 | United Kingdom |
| 724667 | 2/1955 | United Kingdom |
| 993419 | 5/1965 | United Kingdom |
| 1088148 | 10/1967 | United Kingdom |
| 1176167 | 1/1970 | United Kingdom |
| 1232922 | 5/1971 | United Kingdom |
| 1315466 | 5/1973 | United Kingdom |
| 1316861 | 5/1973 | United Kingdom |
| 1383179 | 2/1975 | United Kingdom |
| 1403093 | 8/1975 | United Kingdom |
| 1553394 | 9/1979 | United Kingdom |
| 2033678 | 5/1980 | United Kingdom |
| 1595800 | 8/1981 | United Kingdom |
| 2162071 | 1/1986 | United Kingdom |

Primary Examiner—Gary F. Paumen
Attorney, Agent, or Firm—Birch, Stewart, Kolasch & Birch

[57] ABSTRACT

The invention relates to a device for supplying power to a car-mounted apparatus by electrically connecting a connector on the car-body and a connector on the car-mounted apparatus, where either of these connectors is installed so that it can freely move and integrally vibrate with the other connector when in a mated condition.

5 Claims, 11 Drawing Sheets

POWER-CONNECTION/CAR-MOUNTING DEVICE AND CONNECTION SYSTEM FOR A CAR-MOUNTABLE APPARATUS

This application is a divisional of copending application Ser. No. 875,583, filed on Jun. 18, 1986, now U.S. Pat. No. 4,767,337.

BACKGROUND OF THE INVENTION

The present invention relates to a mechanical and electrical power connection device and system for connecting a car-mounted apparatus, such as an electric pot, to a car, and more particularly, to the inside of the car.

Conventionally, any apparatus to be mounted inside a car, for example an electric pot, is either secured to part of the car compartment with a screw, placed on a seat or hung on a window frame. However, to replace such an apparatus secured to part of a car compartment, or to change its position or direction, the screw must be removed each time, and is therefore inconvenient. If such an apparatus were merely placed on a seat, it might not be safe and the apparatus may get lost. If the apparatus is hung on a window frame, shock or vibration generated during driving may disengage it. In addition, contacting parts between the apparatus and the fixing device wear out due to continuous jolting of the car, shortening the service life of the car-mounted apparatus.

Conventionally, any apparatus such as an electric pot is attached to a convenient part of a car compartment so that it can easily be mounted and removed. Thus, while the car is running, different vibration conditions are present between the car body and the installed apparatus. Therefore, when connecting parts are firmly fixed to the apparatus and car body, they are subjected to different vibration conditions, causing them to be damaged easily. To prevent this, there is a growing demand for a reliable power-connector device resistant to vibration and capable of maintaining a satisfactory connection over a long period of time.

SUMMARY OF THE INVENTION

To eliminate the disadvantages mentioned above, the present invention aims at providing a device for connecting a car-mounted apparatus to a power source that is completely free from wear caused by vibration and is capable of stably maintaining a satisfactory connection for a long period of time. The present invention aims at providing a device for connecting a car-mounted apparatus, such as an electrical pot, which is resistant to vibration of the car body and is easily handled.

Other objects and the further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Referring now to the accompanying drawings, one of the preferred embodiments of the present invention is described below.

Figure 5:
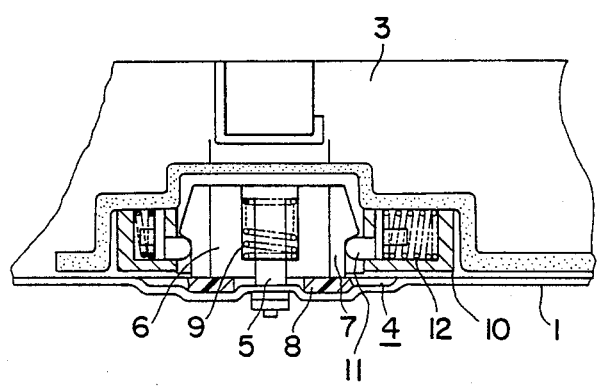
FIG. 5 is a sectional view showing an elastic supporting device for the air-pot shown in FIG. 4.

The reference numeral 1 denotes a substrate secured to an appropriate position of a car body 2. The reference numeral 3 denotes an air pot provided with water-heating and temperature-preserving functions, which can be installed onto the substrate 1 via an elastic supporting unit 4 so that it can be freely mounted and removed. As shown in FIG. 5, the elastic supporting unit 4 comprises a shaft-like bolt 5 erected on the substrate 1, an engaging boss 6 coupled to the shaft 5 with free vertical movement and providing projection 7 on its external circumference, a silencer 8 made of an elastic material, such as rubber, inserted between the engaging boss 6 and the substrate 1, a spring 9 provided around the external circumference of the shaft 5 and held inside the engaging boss 6 to constantly bias it in a downward direction, a circular supporter 10 provided inside the recessed bottom surface of the air-pot 3, a plurality of clamp pins 11 installed on the internal surface of the circular supporter 10 at equal intervals so they can freely project into and retract from the internal surface, and springs 12 which are provided inside the circular supporter 10 and constantly bias each of the clamp pins 11 in the direction of projection. The air-pot 3 is installed onto the substrate 1 by first coupling the supporter 10 to the external circumference of the engaging boss 6 to cause each clamp pin 11 to be engaged with the projection 7. When the engagement of these components is completed, the air-pot 3 is elastically supported by the silencer 8 and the spring 9. When the air-pot 3 is raised by applying force thereto, the clamp pins 11 retract, resisting the force of the spring, so that the engaging boss 6 is disengaged from the projections 7 to allow the removal of the air-pot 3.

Figure 3:
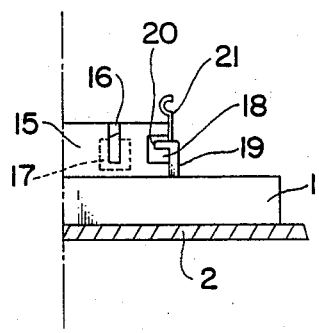
Figure 3A:
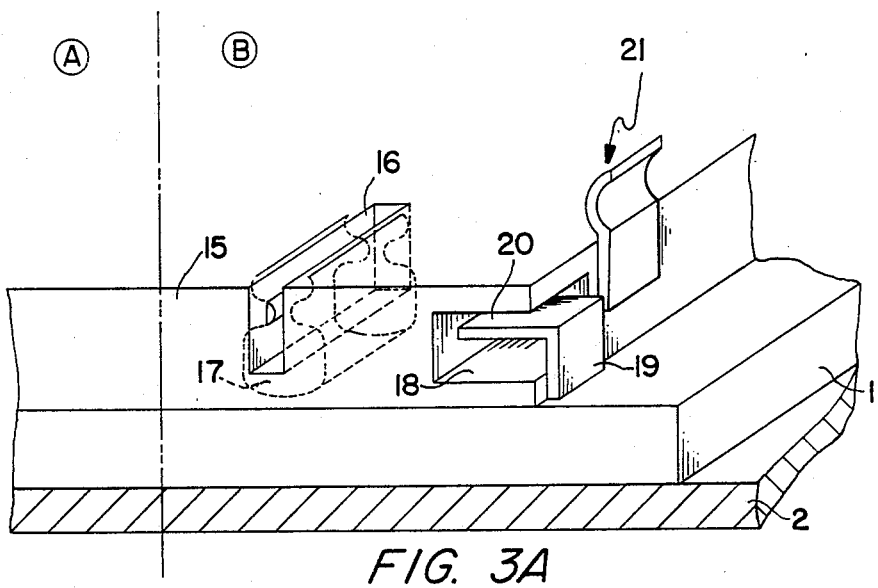
FIG. 3A is an enlarged perspective view of FIG. 3, showing further details of the power source connecting device of FIG. 1.
Figure 3B:
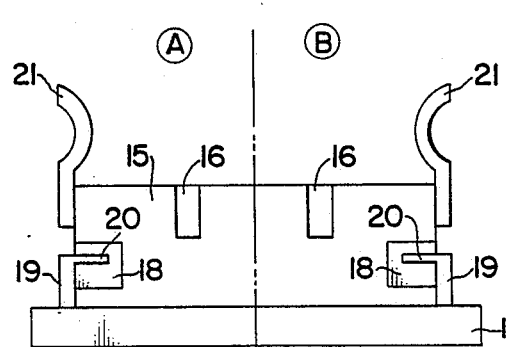
FIG. 3B is an enlarged left side view of FIG. 3 showing further details of the power source connecting device of FIG. 1.
Figure 3C:
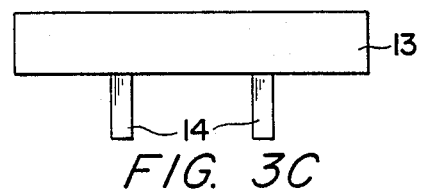
FIG. 3C illustrates the location of a pair of electrodes for the power source connecting device of FIG. 1 with respect to an apparatus-side connector.
Figure 3D:
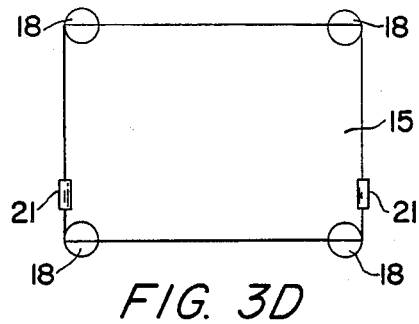
FIG. 3D is a top plan view of a connector showing the location of a pair of connector clips.
Figure 4:
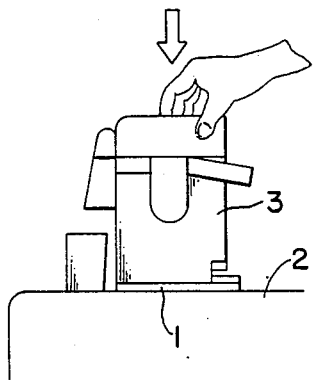
FIG. 4 illustrates the condition in which an air-pot is fixed to part of the car body in accordance with one of the preferred embodiments of the present invention.

The reference number 13 denotes an apparatus-side connector installed beneath the bottom surface of the air-pot 3, while the connector is provided with a pair of electrodes 14 depending from the apparatus-side connector as shown in FIG. 3C. The reference numeral 15 denotes a car-side connector which is provided with grooves 16 as shown in FIGS. 3, 3A, and 3B receiving electrodes 14 and with electrode supporters 17 inside of the grooves 16 for enabling an electrical connection to electrodes 14, while the connector 15 is supported on the substrate 1 so that it can move freely. The reference numeral 18 denotes cutaway portions in each of four corners of the car-side connector 15. The reference numeral 19 denotes a metal supporter erected on the substrate 1, while the tip end 20 of each of the bent metal supporters 19 is inserted into each of the cutaway portions 18, and metal supporters 19 support the car-side connector 15 so that the car-side connector can freely move in both lateral and vertical directions within the range allowed by the cutaway portion 18. The reference numeral 21 denotes a pair of connector clips installed on both side surfaces of the car-side connector 15 as shown in FIGS. 3B and 3D, the connector clips 21 being made of resilient material, and which engage with both side surfaces of the apparatus-side connector 13. The reference numeral 22 denotes the power-supply cord. Based on the construction mentioned above, when coupling the supporter 10 supporting the air-pot 3 against the external circumference of engaging boss 6, a pair of electrodes 14 of the apparatus-side connector 13 are respectively inserted into the grooves 16 of the car-side connector 15 to be electrically connected to electrode supporters 17 inside of the grooves 16. This allows power to be fed to the air-pot 3 and the connector clips 21 to be elastically engaged with both side surfaces of the apparatus-side connector 13, and allows the state of connection to remain by sandwiching the connector 13 between the air pot and the car-side connector. Consequently, although different conditions of vibration are present between the substrate 1 on the part of the car body 2 and the air-pot 3 while the car is running, since the car-side connector 15 can freely move within a specific range against the substrate 1, the car-side connector 15 integrally vibrates with the apparatus-side connector 13. This prevents both connectors 13 and 15 from being destroyed due to uneven vibration between them and allows the connection to remain unaffected. Note that the first preferred embodiment described above provides the car-side connector with free movement. However, the apparatus-side connector may also be provided with free movement. Likewise, an identical functional effect can be expected when the connection instrument is set to the apparatus-side connector. As is clear from the above explanation, the present invention provides a power-source connection device that securely maintains a stable connection over a long period of time without being affected by vibration.

Figure 6:
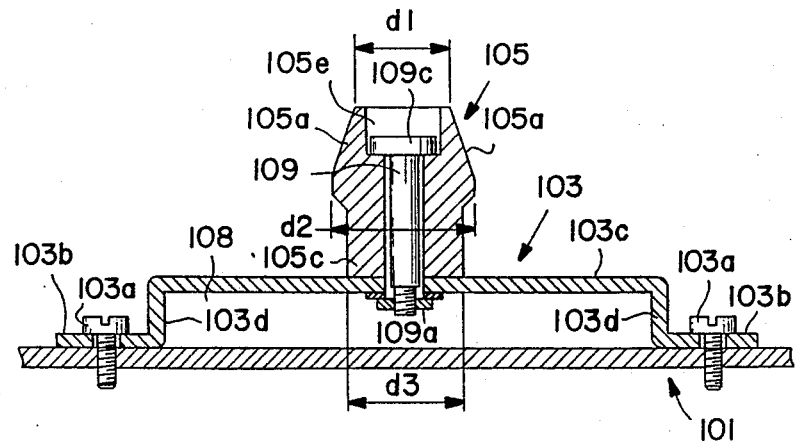
FIG. 6 is a sectional view of the projection of a coupling device for a car-mounted instrument, such as an air-pot, denoting the second preferred embodiment of the present invention.
Figure 7:
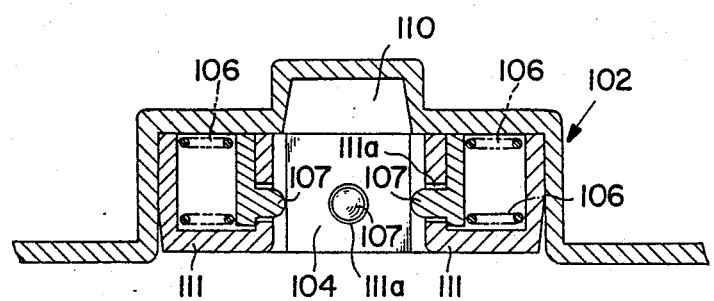
FIG. 7 is a sectional view of the recessed area of a coupling device of the second preferred embodiment.
Figure 8:
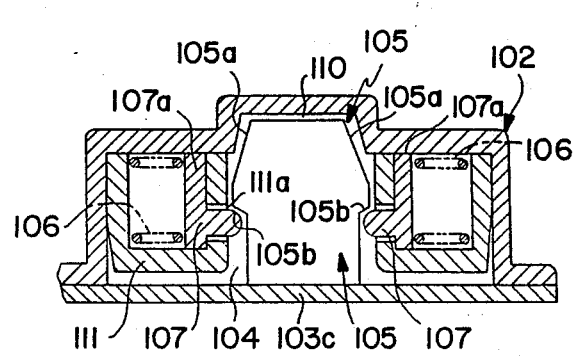
FIG. 8 is a sectional view denoting the state in which the male and female parts are engaged with each other according to the second preferred embodiment.

Referring now to FIGS. 6 through 8, the second preferred embodiment of the present invention is described below. The engaging device for a car-mounted apparatus such as a car-pot reflecting the present invention includes a fixing plate 103 secured to part of a car body 101 (e.g. the inside of a door) with a screw 103a, for supporting a car-mountable instrument 102. A female part 104 used for engagement is provided in either the car-mountable instrument 102 or the fixing plate 103. A male part 105 engaging with the female part 104 is provided on the other unit, being either the car-mountable instrument 102 or the fixing plate 103. This structure allows the female part 104 and male part 105 to be engaged by means of engaging members 107 supported by springs 106 so that they can freely be engaged and disengaged. In the second preferred embodiment, the female part 104 and male part 105 are respectively installed to the car-mounted instrument 102 is formed by a stationary plate 103b secured to the car body 101, a sheet 103c that projects from the car body 101 to form a gap 108 between the car body 101 and fixing plate 103, and interconnecting plates 103d which are integrally attached to the sheet 103c and stationary plate 103b. The male part 105 used for engagement is provided in substantially the center part of the front surface of the sheet 103c. The male part 105 is made from hard plastic resin, while the tip portion of the male part 105 has a diameter d1 and the male part 105 has a maximum diameter of d2.

The male part 105 is formed in a mushroon-like structure. The male part 105 comprises an umbrella-like first incline 105a pressing against the engaging members 107 biased by the springs 106 when the male part 105 is engaged with the female part 104, a second incline 105b which is provided with an incline inverted relative to the first incline 105a which externally supports the engaged male part 105a and female part 104 when engaged with each other, and a neck part 105c connected to the second incline 105b and provided with a diameter d3 as shown in FIGS. 6 and 8. The second incline 105b is provided with an angle steeper than that of the first incline 105a. The male part 105 is secured to the sheet 103c with a screw 109. The screw 109 is provided with a nut 109a at its lower end which passes through sheet 103c. The head part 109c of the screw 109 comes into contact with the bottom surface of the center hole 105e of the male part 105. The male part 105 is then secured to the sheet 103c with the head part 109c of the screw 109 and the nut 109a. The female part 104 is provided with a space 110 allowing the entry of part of the tip end of the convex 105 when the male part 105 is engaged with the female part 104. A case 111 is secured at four positions of the inner circumferential wall of the female part 104. The engaging member 107 projects from through holes 111a of the case 111 towards the center of the concave female part 104. The case 111 is internally provided with supporting members 107a which are integrally connected with engaging members 107. The springs 106 that bias the engaging members 107 toward the center of the female part 104 are installed between the support members 107a and the inner wall of the case 111. When the male part 105 enters the engagement, the engaging members 107 come into contact with the first incline 105a of the male part 105, and then disposed to the position for engagement with the second incline 105b. Consequently, the width between the sides of the female part 104 is almost equivalent to the maximum diameter d2 of the male part 105, whereas the width between the sides of the space 110 is slightly wider than the tip diameter d1 of the male part 105. Next, the function of these components is described below. The user of the electric pot first engages the female part 104 of the car-mounted instrument 102 with the male 105 by inserting it by hand. Then, the first incline 105a formed on the male part 105 is pressed against the engaging members 107. This is due to the presence of the supporting members 107a supporting the engaging members 107. When the user further presses the car-mounted instrument 102 for closer engagement, the elastic force of the springs 106 cause the engaging members 107 to move across the first incline 105a and engage with the second incline 105b, thus allowing the male part 105 to be fully inserted into the female part 104. Since the engaging members 107 are engaged with the second incline 105b, even when the car body 101 is vibrating, the car-mounted instrument 102 is prevented from being disengaged from the car body 101. In addition, since the width between the sides of the female part is almost equivalent to the maximum diameter d2 of the male part 105, when the engaging members 107 move across the first incline 105a, the engaging members 107 are fully inserted into the case 111. Conversely, when removing the car-mounting instrument 102 from the fixing plate 103, the user manually pulls out the car-mounting instrument 102 from the fixing plate 103 to allow the engaging members 107 to move across the second incline 105b, so that the car-mounting instrument 102 is then easily removed. In this second embodiment, a female part and male part are respectively provided for the car-mounting instrument and the fixing plate. Conversely, it is also possible for the system to provide a female part on the fixing plate part and a male part on the car-mounting instrument part. It is also possible for the system to provide the engaging member on the male part instead of the female part.

As is clear from the foregoing explanations, the present invention relates to the engaging device of a car-mounted instrument featuring the provision of a fixing plate to support the car-mounted instrument on part of a car body, a male part in either the car-mounting instrument or the fixing plate, and a female part for engaging with the male part on either the car-mounted instrument or the fixing plate, and engagement of the female and male parts by means of engaging means supported by spring means so that they can freely be engaged and disengaged.

According to the present invention, since a car-mounted apparatus such as an electric pot can withstand continuous vibration of the car body by the engagement of a female part with a male part using spring means, and also be removed easily from the engaged fittings, users can handle a car-mounted electric pot more conveniently while driving.

Figure 9:
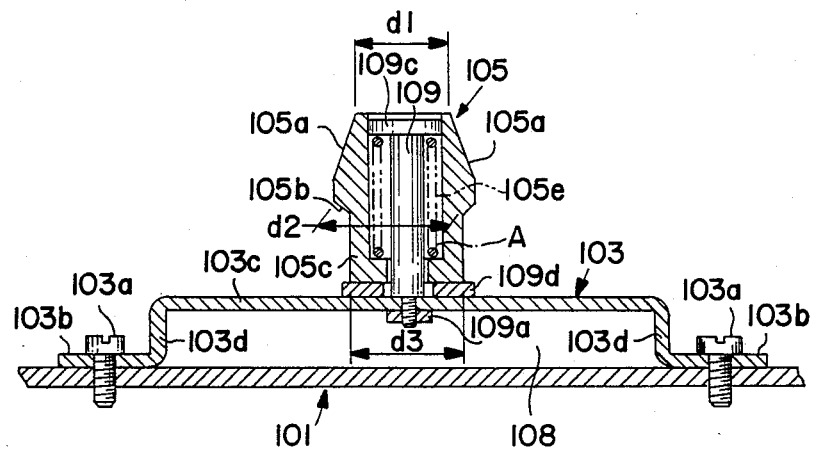
FIG. 9 is a sectional view of the male part of the coupling device for a car-mounted instrument, such as a car-pot, denoting the third preferred embodiment of the invention.
Figure 10:
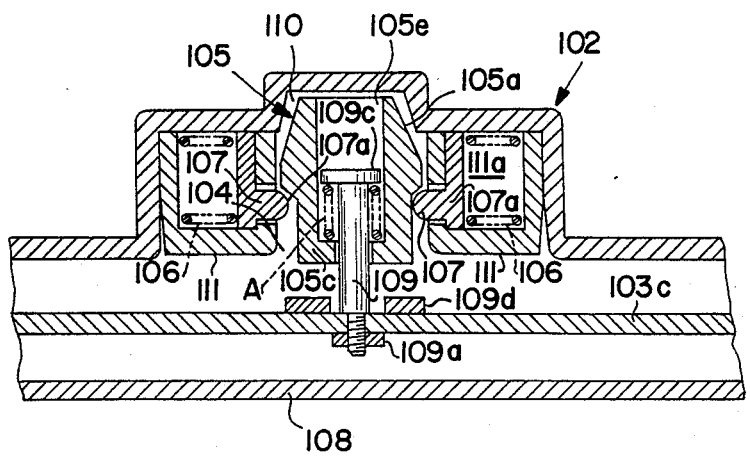
FIG. 10 is a sectional view denoting the state in which the male and female parts are engaged with each other.
Figure 11:
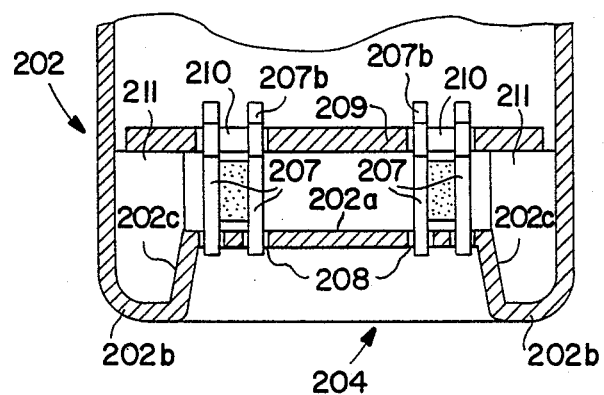
FIG. 11 is a sectional view of the main part of a car-mounted instrument denoting the fourth preferred embodiment of the present invention.
Figure 12:
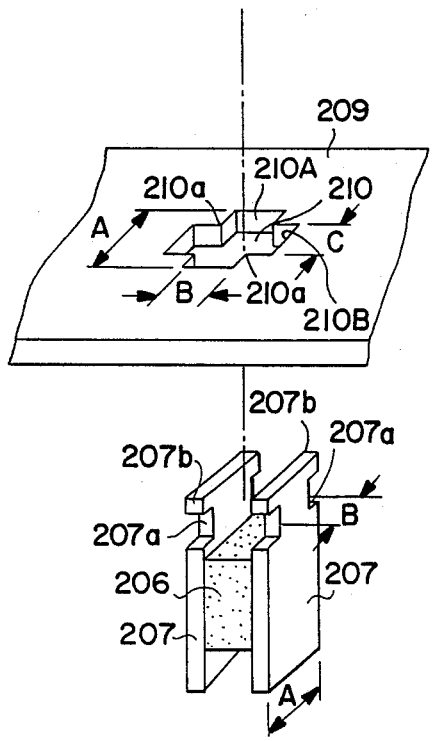
FIG. 12 is an exploded perspective view of the installed magnetic substance according to the fourth preferred embodiment.
Figure 13:
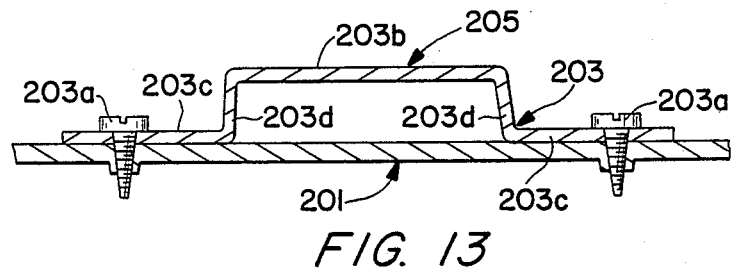
FIG. 13 is a sectional view of the apparatus fixing plate according to the fourth preferred embodiment.
Figure 14:
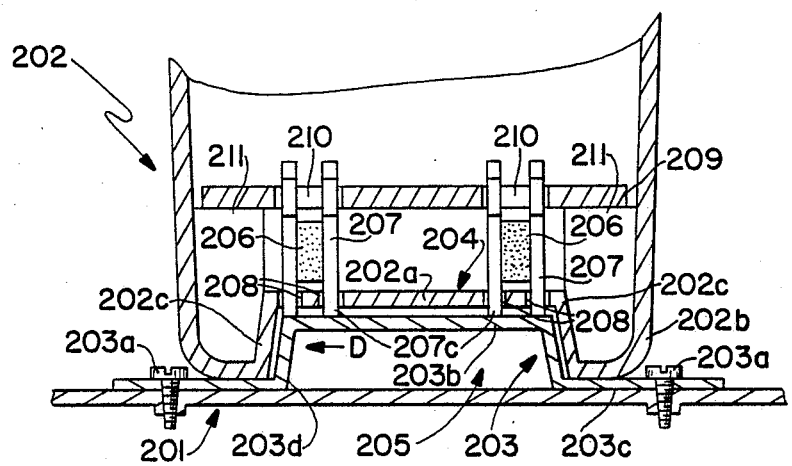
FIG. 14 is a sectional view denoting the state in which the car-mounted instrument and fixing plate are engaged with each other.

Referring now to FIGS. 9 and 10, the third preferred embodiment of the present invention is described below. Explanations of those parts identical to those which are explained in the second embodiment (FIGS. 6 through 8) shall be deleted except for the reference numerals given below. The third embodiment features a construction which includes the female part 104 formed in the car-mounted apparatus 102, the male part 105 provided on the fixing plate 103 for engagement with the female part 104, a first spring A provided between the male part 105 and the fixing plate 103 supporting the male part 105, and the engagement of the female part 104 with the male part 105 by means of engaging members 107 supported by second springs 106 so that they can freely be engaged and disengaged.

The tip of the male part at the first incline 105 is of diameter d1 as shown in FIGS. 9 and 10. The maximum diameter of the bottom of the first incline 105a is designed to be d2, and the neck part 105c is of diameter d3. The male part 105 is secured to the sheet 103c with a screw 109 penetrating the center of the male part 105. A nut 109a is set to the bottom end of the screw 109 through the sheet 103c.

The first spring A is provided between the bottom surface of the head-part 109c of the screw 109 and the bottom surface of the central male 105e which is vertically provided in the male part 105, while the male part 105 is secured to the fixing plate 103 with the head part 109c of the screw 109 and the nut 109a. In addition, a sound absorber 109d having a damping function is provided between the male part 105 and the sheet 103c.

Figure 1:
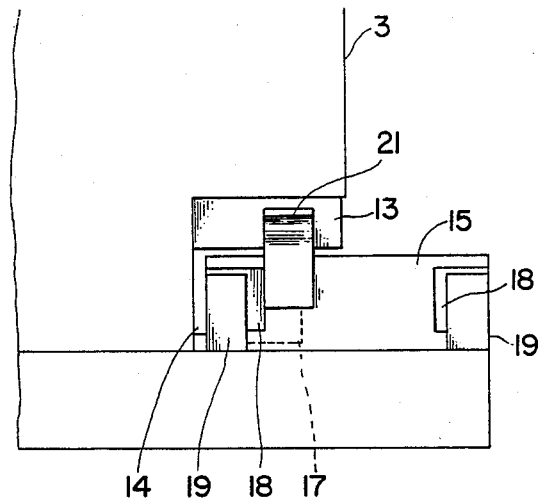
FIG. 1 is a front view of the power-source connection device of a car-mounted apparatus reflecting one of the preferred embodiments of the present invention.
Figure 2:
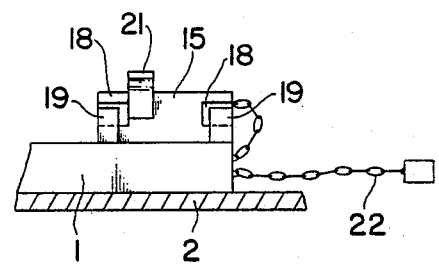
FIGS. 2 and 3 are respectively the front and left-side views of the power-source connecting device shown in FIG. 1, denoting the connecting part attached to the car body.

When the car body 101 incurs less vibration, the car-mounted apparatus 102 securely remains on the sheet 103c. However, when vibration intensifies, as shown in FIG. 10, the car-mounted apparatus 102 may become disengaged from the sheet 103c. Nevertheless, since the male part 105 can adjust its position by means of the first spring A, the first spring A functions as a buffer, even if the car-mounted apparatus is disengaged from the sheet 103c, and the female part 104 and male parts 105 cannot be disengaged immediately. As was already explained in reference to FIGS. 1 through 3 in the first preferred embodiment of the present invention, although the fixing plate 1 on the part of the car body 2 and the car-mounted apparatus 3 generate vibrations different from each other, since the connector unit 15 on the part of the car body can move freely within a specific range against the fixing plate 1, the connector unit 15 integrally vibrates together with the connector unit 13. Thus, the connectors 13 and 15 cannot be affected by the effect of different vibrations. These connectors, however, can remain securely connected. In the third preferred embodiment, a female part is provided for the car-mounted apparatus and a male part for the fixing plate to implement their engagement. Conversely, it is also possible for the system to provide the female part on the fixing plate and the male part on the car-mounted apparatus. In addition, it is also possible for the system to provide an engaging member on the male part instead of the female part, as in the preceding preferred embodiment. As is clear from the foregoing explanations, the present invention relates to a device for engaging the car-mountable apparatus with the car-body, which is comprised of the following: a fixing plate for securing the car-mounted apparatus to the car body, a female part formed in either of the car-mounted apparatus or fixing plate, a male part formed on either the car-mounted apparatus or a fixing plate for engagement with the female part, a first spring provided for either the male part of female part for buffering vibration of the car-mounted apparatus, and an engaging member held by a second spring, which causes the female and male parts to be freely engaged and disengaged. Thus, according to the present invention, since a car-mounted apparatus such as an electric pot can withstand continuous vibrations of the car body by the engagement of a female part and a male part using spring means and can also be easily removed from the engaged members, a car-mounted electric pot can be used more conveniently while driving.

Referring now to FIGS. 11 through 14, the fourth preferred embodiment of the present invention is described below. The device for engaging any car-mountable apparatus such as an electric pot related to the present invention comprises a metallic fixing plate 203 made, for example of iron, supporting a car-mountable apparatus 202 is secured to part of a car-body 201, such as the inside of a door, with a screws 203a, a female part 204 formed in either the car-mounted apparatus 202 or the fixing plate 203; a male part 205 which is freely engaged with and disengaged from the female part 204 provided in either the car-mounted apparatus 202 or the fixing plate 203; and a magnetic substance 206 positioned at the bottom part of the female part 204 and sandwiched by a pair of steel sheets 207, while the male part 205 is made of a suitable material, such as iron, to which the magnetic substance 206 can attach itself. The fixing plate 203 comprises a top plate 203b of a male part projected inside the car body 201, a stationary plate 203c secured to the car body 201 with the screws 203a, and an incline plate 203d that connects the plates 203b and 203c, these plates being integrally formed by either being pressed or constructed (Fixation of other members may be done by welding). The male part 205 is comprised of the top plate 203b and the incline plate 203d of the male part 205. The female part 204 comprises a bottom plate 202a formed in the bottom surface of the car-mounted apparatus 202, a plate 202b that adheres to and separates from the stationary plate 203c, and incline wall 202c that extends between the plates 202a and 202b. A pair of long holes 208 are provided on both sides of the bottom plate 202a. A sheet-like first supporter 209 is positioned at the upper portion of the female member 204 for holding steel sheets 207, while the first supporter 209 is provided with holes 210. The steel sheets 207 are installed by penetrating the long holes 208 and the supporting holes 210. The magnetic substance 206 is provided between a pair of steel sheets 207, while cutout portions 207a are formed on both sides of the upper part of the steel sheets 207. The cutout portions 207a provide engaging members 207b on both sides of the upper portion of the steel sheets 207 for engaging these members with the first supporter 209.

Supporting holes 210 are respectively formed in a cross shape by means of long-hole 210A and small hole 210B at the center of the hole 210.

The length A of the long hole 210A corresponds to the width of the steel sheet 207 and the width B between both sides of the long hole 210A which is at least wider than the thickness of the two pieces of the steel sheet 207. The full length C of small hole 210B in supporting hole 210 is substantially identical to the width of the cutout portions 207a of the steel sheet 207. The engaging member 207b of the steel sheet 207 is engaged with the hole wall 210a of the small hole 210B in the supporter 209. The first supporter 209 is held by a second supporter 211 which is formed in the side of female part 204.

Next, the functions of these component members are described. The male part 205 formed on the fixing plate 203 is inserted into the female part 204 formed in the car-mountable apparatus 202 so that these can be engaged with each other. At the same time, the first male member 207a formed on the steel sheet 207 is pressed against the plate 203b. This is because the magnetism of the magnetic substance 206 attracts the metallic plate 203b through the steel sheet 207. The attracting force of the magnetic substance 206 is insufficient in the sliding direction (which corresponds to direction D shown in FIG. 14). Thus, when an attracting force is applied to the car-mounted apparatus in the sliding direction, due to inertia for example generated at the moment the car stops, the inclined surfaces 202c and 202d of the female part 204 and the male part 205, respectively, are engaged with each other to prevent the steel sheet 207 from sliding towards the plate 203b. This increases the attraction and retention effect against vertical and horizontal vibration of the car body. In addition, when installing the car-mountable apparatus 202 to the fixing plate 203 from the upper position, the female and male configuration serves for guiding the positioning of the apparatus. If it is necessary to manually carry the car-mountable apparatus 202, the user first holds the apparatus with his hand and then lifts it up from the fixing plate 203 by applying a greater force than the magnet attracting force generated by the magnetic substance 206.

When positioning the steel sheet 207 into the supporting hole 210 during assembly, the following processes are executed. First, the surfaces of a pair of steel sheets 207 are aligned with each other, and penetrate through the long hole 210A in the supporting hole 210. The steel sheets 207 are then separated from each other. Next, the engaging members 207b are engaged with the hole wall 210a in the small hole 210B by inserting the cutout portions 207a formed on each steel sheet 207 into the small hole 210B. The magnetic substance 206 is then sandwiched by these steel sheets 207 to allow the magnetic substance 206 to attract the steel sheets 207. Next, the lower parts of the steel sheets 207 held by the supporter 209 are respectively pushed, through the long holes 208 of the female part 204, and finally the first supporter 209 and the second supporter 211 are respectively fixed. In the fourth preferred embodiment, the female and male parts are respectively provided for in the car-mountable apparatus and fixing plate. Conversely, it is also possible for the system to provide the female part on the fixing plate and the male part on the car-mounted part.

The tip end of the steel sheet 207 corresponds to the position of the bottom part of the car-mounted apparatus 202 by a specific distance (h). If the tip end of the steel sheet is either flush with or projects from this position, when actually coupling the apparatus 202 to the fixing plate 103 attached to the car body by using magnetic attraction, any substance susceptible to magnetism may obstruct it. As a result, the car-mounted apparatus 202 cannot correctly be engaged with the designated position of the fixing plate 203.

As is clear from the foregoing explanations, the present invention relates to a device for engaging a car-mounted apparatus, which comprises a fixing plate for supporting a car-mounted apparatus on part of the car body, a female part provided on either the car-mounted apparatus or the fixing plate, a male part engaged with the female part provided on either the car-mounted apparatus or the fixing plate, and a magnetic substance secured to the bottom part of the female part so that the male part is of material susceptible to magnetism. According to the present invention, the car-mounted apparatus is secured to the fixing plate by means of the attractive force of a magnetic substance so that it can freely engage with and disengage from the fixing plate, and accordingly, when the car-mounted apparatus is carried, it can easily be removed from the fixing plate. In addition, due to the combined effect of the magnetic attractive force and the engagement of the female and male parts, the coupled unit is durably resistant to vibration of the car body, thus providing users with better handling convenience.

The power-connection device for a car-mounted apparatus described in conjunction with the first preferred embodiment is provided with a pair of electrodes 14. The electrodes 14 may be of identical length, and three electrodes may also be used instead of two.

Figure 18:
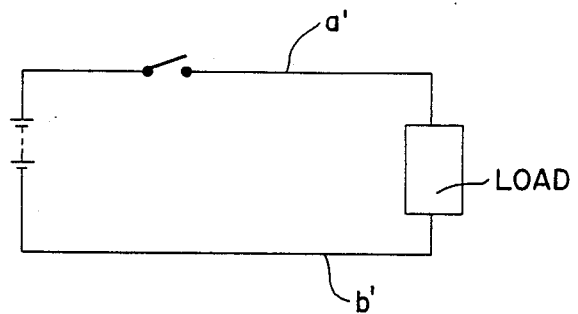
FIG. 18 is a wiring diagram using two wires.
Figure 19:
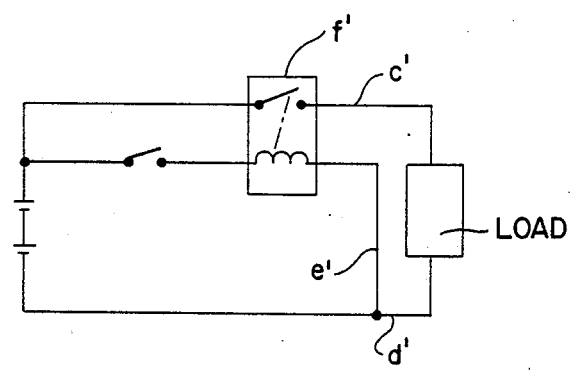
FIG. 19 is a wiring diagram using three wires.

Conventionally, according to the electrical capacity available, dual-line and triple-line wiring arrangements are usual for car-mounted apparatuses. These wiring arrangements are respectively shown in FIGS. 18 and 19. The dual-line wiring diagram shown in FIG. 18 comprises a power-supply line a' and a ground (earth) line b'. The triple-line wiring diagram shown in FIG. 19 is for a greater electrical capacity and comprises a power-supply line c', a ground line d', and a control line e', in which conduction of power through the power-supply line c' is controlled by a relay f'.

Figure 15:
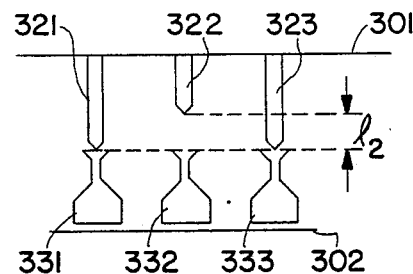
FIGS. 15A through 17A are respectively views denoting the relationship between electrode terminals and electrode inserting parts.
Figure 16:
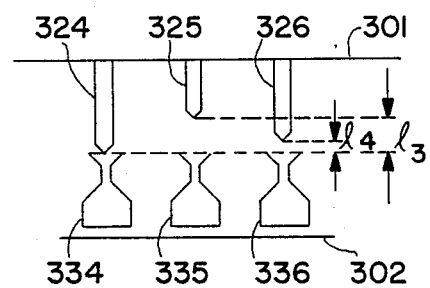
Figure 17:
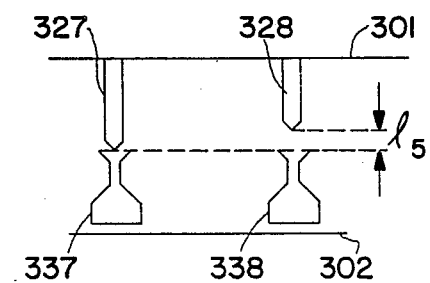
Figure 15A:
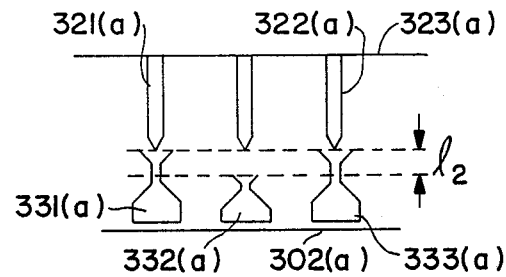
Figure 16A:
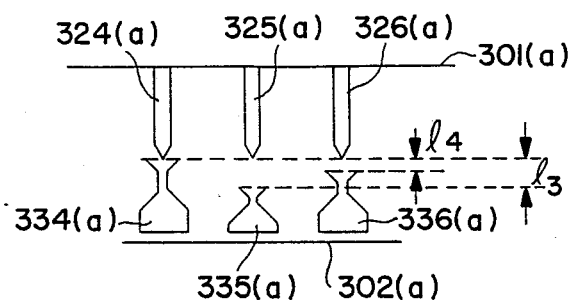
Figure 17A:
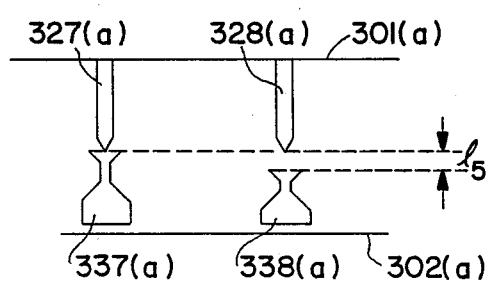

FIGS. 15 and 16 respectively denote the relationship between the respective electrode terminals of electrical appliances which are provided with a triple-line wiring arrangement and those parts allowing the insertion of electrodes. FIG. 15 denotes the following arrangement: Of those electrode terminals 321, 322, and 323 which are provided in the lower part of an electrical apparatus 301, electrode terminal 322 of the control circuit provided in the center position is shorter than electrode terminals 321 and 323 of the power-supply circuit located on both sides of the terminal 322. On the other hand, the configurations and heights of electrode insertion ports 331, 332, and 333 respectively positioned on substrate 302 corresponding to the electrode terminals 321, 322, and 333, are identical. Electrode terminal 322 of the control circuit is shorter than electrode terminals 321 and 323 of the power-supply circuit by length "12". When provisionally placing an electrical apparatus 301 on the substrate 302, electrode terminals 321 and 323 respectively come into contact with the corresponding electrode insertion ports 331 and 333 on the substrate 302, whereas the electrode terminal 322 in the center position remains disconnected from the corresponding electrode insertion port 332. FIG. 16 denotes the following arrangement. Electrode terminals 324, 325, and 326 which are provided in the lower part of the electric apparatus 301 respectively have different lengths. Of these, the electrode terminal 324 of the power-supply circuit shown to the left is the longest, whereas electrode terminal 325 of the control circuit in the center is the shortest. In other words, electrode terminal 326 shown to the right is shorter than electrode terminal 324 shown to the left by length "14". In addition, electrode terminal 325 in the center is shorter than electrode terminal 324, shown to the left, by length "13". When the electrical apparatus 301 is merely and provisionally placed on substrate 302, only the electrode terminal 324 shown to the left comes into contact with the corresponding electrode insertion port 334 on the substrate 302, or the electrode terminals 324 and 326 on both sides respectively come into contact with the corresponding electrode insertion ports 334 and 336 on substrate 302, whereas the electrode terminal 325 in the center and the corresponding electrode insertion port 335 do not come into contact with each other. As a result, it is possible for the power-supply connection device to prevent electrodes from being damaged. FIG. 17 denotes the relationship between electrode terminals 327 and 328 of electrical apparatus 301 having a dual-line wiring arrangement and electrode insertion ports 337 and 338 provided on the substrate 302. The electrode terminal 328 of the power-supply circuit is shorter than that of the other electrode terminal 327 of the power-supply circuit by length "15". When the electrical apparatus 301 is temporarily placed on the substrate 301, electrode terminal 328 and the corresponding electrode insertion port 338 on the substrate 302 remain unconnected with each other. By implementing the construction described above, even when the electrical apparatus 301 is placed temporarily on the substrate 302, no voltage is applied to the electrodes of the power-supply circuit. Even if the connection is unstable, no electric arc is generated, thus preventing the electrodes from being damaged. Needless to say, in any of the circumstances shown in FIG. 15 through FIG. 17, when the electrical apparatus 301 is securely fixed on the substrate 302, electrode terminals though being made short, are long enough to be securely inserted into the electrode insertion ports. In the preferred embodiments as shown in FIGS. 15 through 17 described above, the objects are achieved by varying the length of the electrode terminals. It is also possible for the system to obtain the same result by varying the lengths of the electrode insertion ports, such as shown in FIGS. 15A, 16A, and 17A, but keeping the length of the electrode terminals identical, or by varying the vertical position of the electrode insertion ports by providing a female part and male part on the upper surface of a substrate 305.

As expressly described above, according to the power-connection structure applied to electrical apparatuses reflecting the preferred embodiments of the present invention, it is possible for the system to securely prevent an electric arc from being created by an inadequate electrical connection when the apparatus is merely placed on a substrate without securely being fixed, and, therefore, avoid unwanted damage to the electrodes.

In the foregoing preferred embodiments of the present invention, explanations have been made with reference to an electric pot for use in a car. However, the spirit and scope of the present invention is not limited to the use of the electric pot, but the present invention may also be applied to other kinds of car-mountable electric appliances as well. Needless to say, applicability of the present invention is not confined to those preferred embodiments cited above, but a variety of modifications and changes may be applied to these embodiments within the spirit and scope of the present invention.

While only certain embodiments of the present invention have been described, it will be apparent to those skilled in the art that various changes and modifications may be made therein without departing from the spirit and scope of the present invention as claimed.

What is claimed is:

1. A power-source connection device for a car-mounted apparatus, comprising:
   a substrate secured to a car body;
   a car-side connector movably supported on said substrate;
   an apparatus-side connector installed on the bottom of said car-mounted apparatus;
   means for mating said car-side connector with said apparatus-side connector, thereby mounting said apparatus-side connector in relation to said substrate;
   means for electrically connecting said car-side connector to said apparatus-side connector; and
   means for supplying power to said car-mounted apparatus when said car-side connector and said apparatus-side connector are electrically connected;
   wherein said car-side connector freely moves with respect to the car body and wherein said car-side connector and said apparatus-side connector integrally vibrate together in response to vibrations of said car body.

2. The connection device according to claim 1, wherein said means for mating includes a pair of connector clips positioned on opposing side surfaces of said car-side connector for securely clamping said apparatus side connector to said car side connector.

3. The connection device according to claim 1, wherein said car-side connector is movably supported on said substrate by a retention assembly including
   cutaway portions formed in the lateral edges of said car-side connector, and
   means, freely movable within said cutaway portions, for movably securing said car-side connector to said substrate, wherein vibrations of said substrate due to vibrations of the car body will be absorbed at said retention assembly thereby preventing vibrational stress between said car-side connector and said apparatus side connector.

4. The connection device according to claim 1, wherein said means for electrically connecting includes electrodes depending from said apparatus side connector and corresponding electrode supporters formed within said car-side connector, said electrodes being inserted into said electrode supporters upon mating of said car-side connector with said apparatus side connector.

5. The connection device according to claim 1, wherein said means for supplying power is a power cord connected to said substrate.

* * * * *